United States Patent
Rowell

[15] 3,650,456
[45] Mar. 21, 1972

[54] APPARATUS FOR WELDING

[72] Inventor: Douglas W. Rowell, North Woodbury, Conn.

[73] Assignee: Anaconda American Brass Company

[22] Filed: May 20, 1969

[21] Appl. No.: 826,198

[52] U.S. Cl. ..................................................228/19, 228/3
[51] Int. Cl. ........................................B23k 1/00, B23k 5/22
[58] Field of Search ........................................228/19, 3, 15

[56] References Cited

UNITED STATES PATENTS

| | | |
|---|---|---|
| 2,934,981 | 5/1960 | Pearson ..................................228/19 |
| 3,085,528 | 4/1963 | La Tour ..................................228/19 |
| 3,349,212 | 10/1967 | Morris et al. ..........................228/19 |
| 3,421,677 | 1/1969 | Jenkins ..................................228/19 |

Primary Examiner—John F. Campbell
Assistant Examiner—Donald P. Rooney
Attorney—Pennie, Edmonds, Morton, Taylor and Adams

[57] ABSTRACT

A method and apparatus for the continuous production of welded tube from a continuous length of strip material wherein the welded seam is cold worked and wherein the physical nature of the welded seam is continuously monitored to insure that a proper weld is produced is described herein.

12 Claims, 4 Drawing Figures

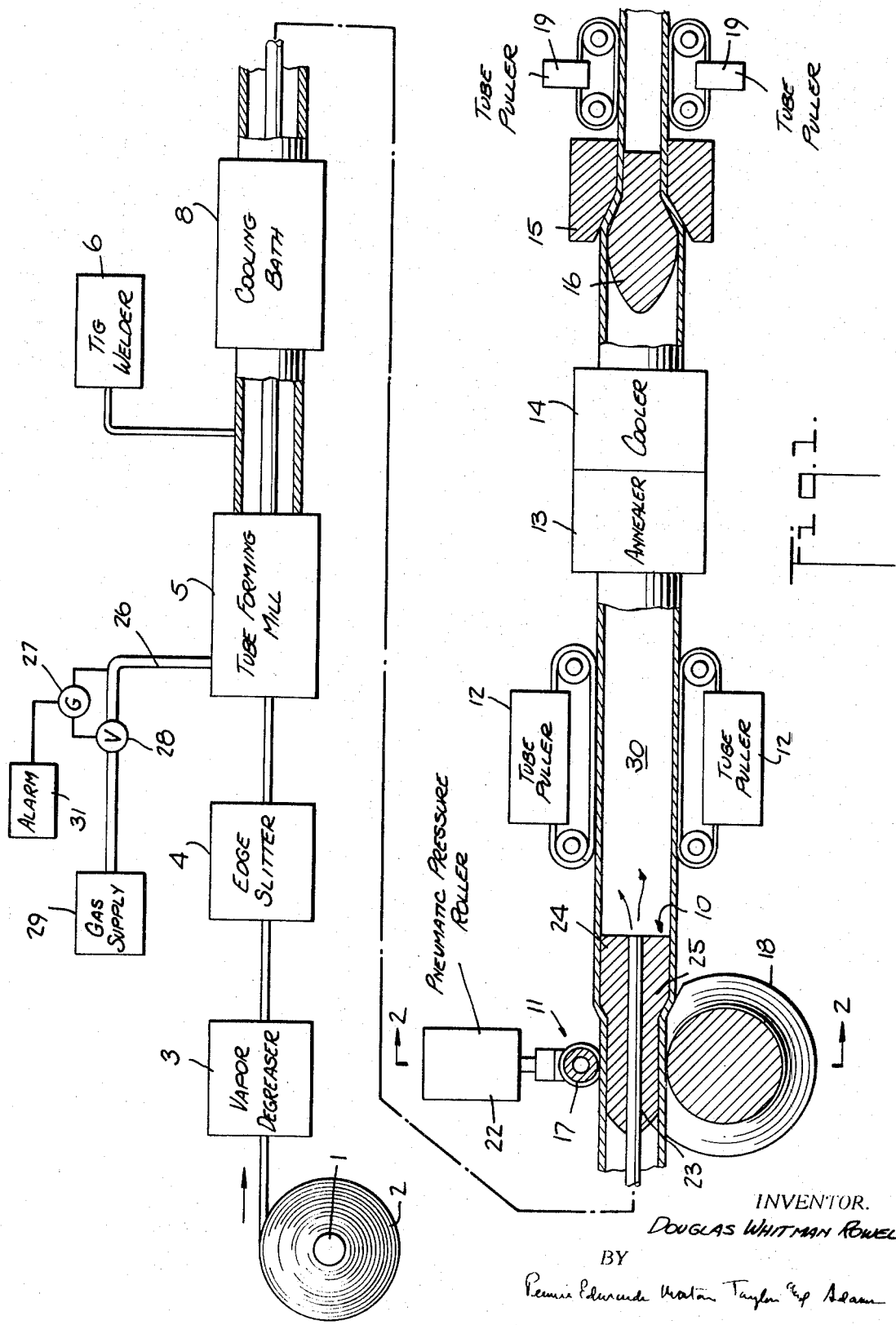

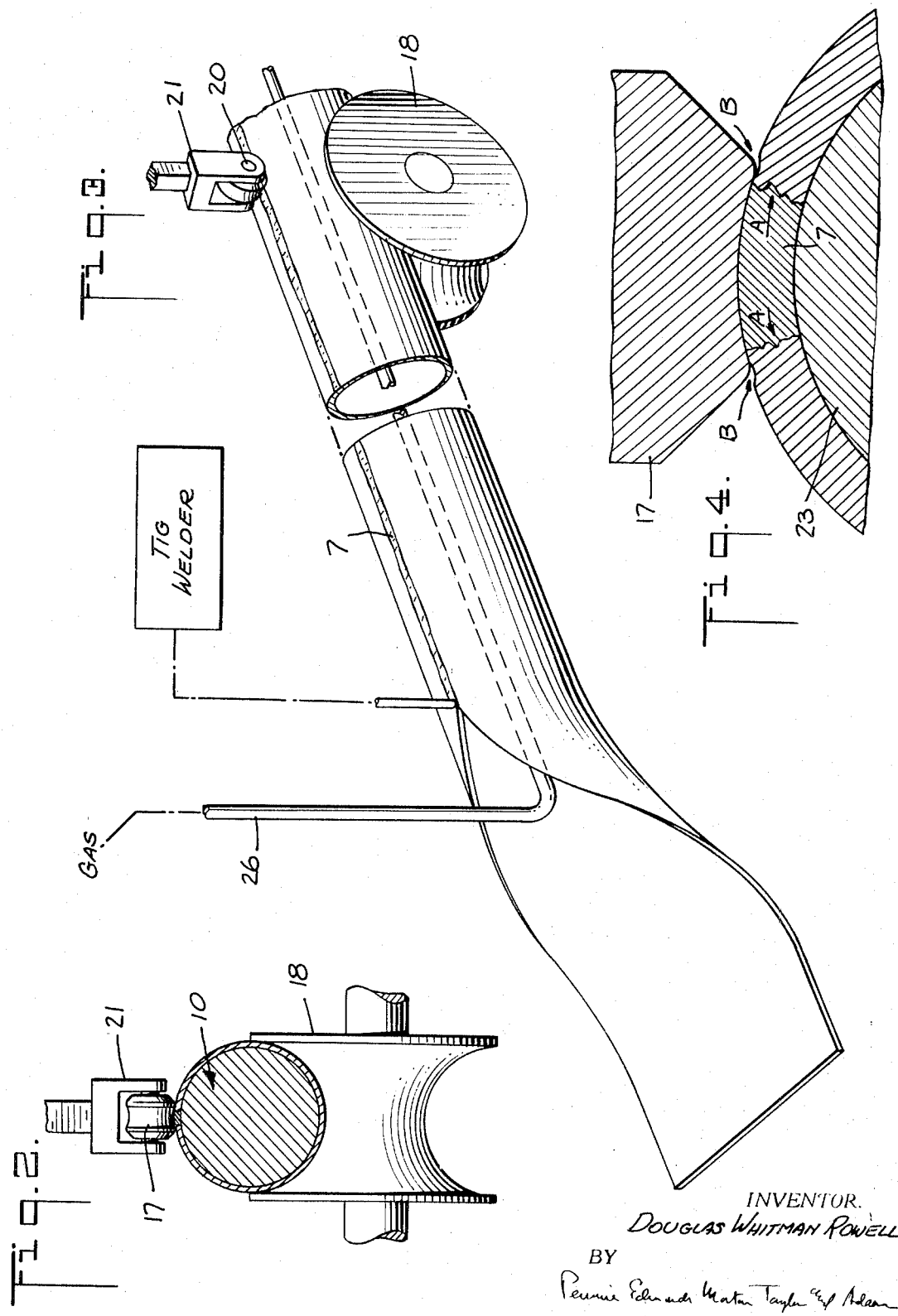

APPARATUS FOR WELDING

BACKGROUND OF THE INVENTION

Many techniques have been devised for producing welded tubes. However, problems have arisen in these past efforts which preclude the production of tubing having a strong and smooth welded seam. Further, efforts have been made in the past to provide a system whereby the welded seam of the tubing may be automatically inspected to locate any imperfections present in the welded seam. These prior efforts have been improved upon by the system set forth below.

SUMMARY OF THE INVENTION

This invention is concerned with a simplified and efficient technique for producing welded tubing having a smooth inner and outer tubular surface and a welded seam strength which is comparable to the strength of the other part of the tubing. This invention also provides a system which automatically senses the undesirable formation of defects in the welded seam, thereby eliminating the need for any constant and continuous surveillance made by an operator.

Broadly stated, this invention contemplates a method and apparatus for processing tubing which is longitudinally seamed by a welded joint of irregular contour by cold working the welded seam. This is accomplished by exerting a pressure greater than the yield point of the tubing along the welded seam while simultaneously supporting substantially the entire underside of the tubing.

Additionally, this invention considers the step of cold working of the welded seam at a point prior to subjecting the tubing to an anneal in order to facilitate complete recrystalization of the grain structure during the subsequent anneal.

Further, this invention may include the added feature of providing a system for confining a gas under pressure within a portion of the tubing along with a system for measuring any changes in the pressure of the confined gas that is located within the tubing in order to locate any discontinuities in the welded seam.

BRIEF DESCRIPTION OF THE DRAWINGS

FIG. 1 is a schematic overall view of the continuous tube forming apparatus;

FIG. 2 is a view taken along 2—2 of FIG. 1;

FIG. 3 is a schematic view in perspective of a portion of the invention; and

FIG. 4 is an enlarged partial view of a portion of FIG. 2.

DESCRIPTION OF THE PREFERRED EMBODIMENT

FIG. 1 illustrates the continuous tube forming apparatus embodying the principles of this invention. A reel 1 is provided about which metal strip material 2 is wound. The strip is continuously fed to a vapor degreaser 3 which cleans the strip material, thereby removing any debris in the form of dirt or grease that may have accumulated on the strip material. A common type of vapor degreaser 3, contemplated by this invention, is one that subjects the strip material to the action of a chemical vapor such as trichloroethylene.

The strip material 2 upon leaving the vapor degreaser 3 is directed to an edge slitter 4 which is of conventional construction. The edge slitter 4 cuts or trims the strip material 2 to the desired width, provides a clean surface for ease of welding, and also shapes the edges of the strip material so that they may abut up against one another for subsequent operations.

The cleaned and trimmed strip material is then fed to a tube forming mill 5 where the strip material 2 is shaped into a tubular form. During the tube forming operation, the edges of the strip material are positioned such that they abut up against one another and thereby are in an engagement for welding.

Following the tube forming mill 5, the strip material 2 is subjected to the continuous welding operation of a welder 6 whereby the edges of the tubular formed strip material 2 are united, thereby forming progressively a continuous length of tubing having a welded seam 7. The preferred type of welder that is used in the operation of this system is a TIG arc welder; however, it is to be understood that any conventional type of welding apparatus, with or without the additional use of filler metal, could be used without departing from the scope of this invention.

Subsequent to the welding operation, the welded tube is cooled in a cooling bath 8 and forwarded to a fixed mandrel 10 and a roller assembly, generally indicated by 11, which cooperate to cold work the seam 7 of the tubing as will be hereinafter explained.

The tubing is then moved over the fixed mandrel 10 and between the rollers 17 and 18 by means of a pair of tube pullers 12 which are positioned at a point subsequent to the roller assembly 11. The tubing is thereafter directed to an annealer 13, cooled in cooler 14 and finally drawn through a fixed forming die 15 by means of a second pair of tube pullers 19.

The forming die 15 cooperates with a floating mandrel 16 which is positioned within the interior of the tubing in slideable engagement with its interior surface and adapted to partially fit within the die 15. Because of the continuous movement of the tubing towards the fixed die 15, the floating mandrel 16 is caused to move toward the fixed die 15 thereby enabling the tubing to be wedged between the outer surface of the floating mandrel 16 and the interior surface of the fixed die 15 in order to accomplish a drawing operation.

The roller assembly 11, as shown in FIG. 2, comprises an upper roller 17 and a lower roller 18. The fixed mandrel 10 is positioned between the two rollers 17 and 18. The upper roller 17 rotates about a shaft 20 which is mounted between the arms of a support 21. The support 21 is connected to a pneumatic pressure device 22 which is constructed to move the upper roller 17 in a vertical direction towards or away from the tubing.

As seen in FIG. 4, the outer surface of the upper roller 17 has a central rolling surface which is arced in shape. The rolling surface is concaved and slightly overlaps the width of the welded seam when the roller 17 is in contact therewith. Further, the concavity of the rolling surface of the upper roller 17 corresponds to that of the welded tubing itself.

The lower roller 18 also carries an outer roller surface which is also concaved in shape. The outside rolling surface of the lower roller 18 is of a size so that it supports substantially the entire undersurface of the tubing.

The fixed mandrel 10, which is positioned intermediate to the upper roller 17 and the lower roller 18, is elongated and generally annular in shape and comprises a cylindrical main portion 23 and a cylindrical expander extension 24 which are connected together by a tapered section 25. The diameter of the expander extension 24 is somewhat larger than the diameter of the main portion 23 for reasons explained hereinafter.

The operation of the roller assembly 11 may be described as follows: After the welded tubing leaves the cooling bath 8, the outer surface of the tubing moves between the upper roller 17 and the lower roller 18 while, simultaneously, its inner surface slideably engages the fixed mandrel 10. Pressure is exerted by the pneumatic pressure device 22 forcing the upper roller 17 downward so that it acts against the welded seam of the tubing. Since the area of contact of the upper roller 17 is substantially smaller than the area of contact of the lower roller 18, the unit (lbs./sq. inch) pressure acting against the welded seam 7 by the upper roller 17 is correspondingly substantially larger than that applied to the underside of the tubing for a given amount of force acting against the tubing. It has been found that to cold work the welded seam, the pressure applied by the pressure device 22 should be at least greater than the yield point of the welded seam material.

The differential in pressure applied against the tubing enables the welded seam 7 to be cold worked without distorting the tubular configuration of the welded tubing. It can be appreciated that the cold working of the welded seam facilitates complete recrystalization of the grain structure during the subsequent anneal and thus serves to produce a strong wrought structure rather than a weaker cast structure initially formed in the weld zone. Further, the application of an increased pressure on the welded seam area forces the seam material to displace peripherally, as shown by the arrows A in FIG. 4, causing a slight increase in the diameter of the tubing to the extent of the material displaced thereby substantially eliminating the pronounced indentations appearing on both the inside and outside surfaces of the tubing caused by the welding operation. The slight irregularities caused by the pressure of the upper roller 17 acting against the welded seam, as shown at B in FIG. 4, are smoothed longitudinally, and process out during the subsequent drawing operation to thereby form a round smooth tubing on both its inside and outside surfaces.

As shown in FIGS. 1 and 3, a gas conduit 26 is provided to extend within the tubular form at a point prior to the welding operation. One end of the gas conduit 26 is connected through a pressure gauge 27 and a valve 28 to a gas supply 29. Its other end is mounted in the fixed mandrel 10 to position the fixed mandrel 10 within the tubing. The gas conduit 26 extends through the fixed mandrel 10 in order to provide communication with a gas pressure chamber 30 defined by the inner surface of the tubing and the fixed and floating mandrels 10 and 16, respectively.

This gas pressure chamber 30 is adapted to retain a confined amount of gas, preferably inert gas, from the supply source and thus monitor the welding process. It has been found that by using the technique herein described any discontinuities in the welded seam, such as the formation of pores, etc., would permit the gas to escape from the gas pressure chamber 30. This escape of gas would cause a drop in pressure to occur in the chamber 30. The pressure drop would be immediately sensed by the gauge 27 which would activate an alarm 31 to warn the operator of the defective welded seam.

Once the defect, in the form of a gas leak in the welded seam, is observed, it is marked and temporarily plugged by the operator. Gas is allowed to flow back into the tubing by means of valve 28 in order to bring the pressure back up to normal for further monitoring the welded seam of the tubing.

The expander extension 24 of the fixed mandrel 10 is advantageously positioned in the system at a point between the welder 6 and the gas pressure chamber 30 in order to provide an additional test to assure the production of a welded seam having the desired qualities. It has been found that subjecting the welded seam to an expansion at this point exposes any inherent seam defects which would ordinarily not be detected immediately but which might occur during subsequent processing or after the tubing is put in actual use for a period of time.

Having best described the invention with particular reference to the preferred forms thereof, it will be obvious to those skilled in the art to which this invention pertains, after understanding the invention, that various changes and modifications may be made therein without departing from the spirit and scope of the invention, as defined in the claims appended hereto.

I claim:

1. An apparatus for the continuous production of welded tubes from a continuous length of strip material comprising a. forming means for shaping the strip material into a tubular form so that the edges of the strip are in a welding engagement,
   b. a welder for uniting the edges of the strip to form a continuous length of tubing having a welded seam,
   c. means positioned subsequent to the welder for cold working the welded seam, including
      i. support means positioned within the formed tube for supporting the tube,
      ii. pressure means for urging the cold seam toward the support means to cold work the seam by creating a pressure greater than the yield point of the welded seam, and
   d. expansion means for expanding the tube after the cold working of the seams to thereby reveal any weakness in the seam.

2. The apparatus of claim 1 wherein said cold working means includes an upper and lower roller acting against the outside surface of said tubing and a mandrel positioned in sliding engagement with the inside surface of said tubing.

3. The apparatus of claim 1 including an annealer positioned subsequent to the cold working means.

4. The apparatus of claim 2 wherein the engaging surface of the upper roller exerts such pressure along the welded seam of the tubing while the lower roller simultaneously supports at a lesser pressure substantially the entire underside of the tubing.

5. The apparatus of claim 4 wherein said mandrel carries an expander extension for increasing the internal diameter of the tubing.

6. The apparatus of claim 1 including a means for confining a gas under pressure within a portion of the tubing after its expansion and a means for measuring any changes in pressure of the confined gas located within the tubing.

7. The apparatus of claim 6 wherein said confining means includes a first and second mandrel, each mandrel spaced from one another within the tubing and being in slideable sealing engagement with the tubing thereby defining a confined area therebetween and a conduit for conveying gas under pressure to said confined area.

8. The apparatus of claim 6 having in addition means for measuring the change in pressure of the confined gas.

9. The apparatus of claim 7 in which the expander means comprises an expander extension of the first mandrel.

10. The apparatus of claim 1 having in addition tube reduction means for reducing the tube diameter after its expansion.

11. The apparatus of claim 1 in which the pressure means in turn comprises a. an upper roller having an arcuate riding surface that corresponds to the outer surface of the tubing, said riding surface having a width being approximately equal to the width of the weld seam;
   b. a lower roller having an arcuate riding surface that substantially supports the underside of the tubing; and
   c. an annular mandrel positioned intermediate the upper and lower roller.

12. The apparatus of claim 11 wherein said mandrel carries an extension having an annular surface which tapers outwardly from an end of the mandrel.

* * * * *